(12) United States Patent
Jeon et al.

(10) Patent No.: US 7,398,466 B2
(45) Date of Patent: Jul. 8, 2008

(54) ELECTRONIC DOCUMENT VERSIONING METHOD AND UPDATED DOCUMENT SUPPLY METHOD USING VERSION NUMBER BASED ON XML

(75) Inventors: Hye Jeong Jeon, Seoul (KR); Kyoung Ro Yoon, Seoul (KR); Bae Geun Kang, Gyounggi-do (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 11/305,703

(22) Filed: Dec. 16, 2005

(65) Prior Publication Data

US 2006/0095834 A1    May 4, 2006

Related U.S. Application Data

(63) Continuation of application No. 10/705,915, filed on Nov. 13, 2003.

(30) Foreign Application Priority Data

| Nov. 14, 2002 | (KR) | ................................ 70576/2002 |
| Apr. 21, 2003 | (KR) | ................................ 25093/2003 |

(51) Int. Cl.
*G06F 15/00* (2006.01)
*G06F 17/00* (2006.01)
(52) U.S. Cl. .................... 715/511; 707/101; 707/203
(58) Field of Classification Search ................ 715/511
See application file for complete search history.

(56) References Cited

U.S. PATENT DOCUMENTS

| 4,847,902 | A | * | 7/1989 | Hampson ................... 713/190 |
| 5,499,365 | A | * | 3/1996 | Anderson et al. ........... 707/203 |
| 5,862,325 | A | * | 1/1999 | Reed et al. .................. 709/201 |
| 5,892,900 | A | | 4/1999 | Ginter et al. |
| 6,185,329 | B1 | | 2/2001 | Zhang et al. |
| 6,473,794 | B1 | | 10/2002 | Guheen et al. |
| 6,502,112 | B1 | | 12/2002 | Baisley |
| 6,635,089 | B1 | | 10/2003 | Burkett et al. |
| 6,675,267 | B2 | | 1/2004 | Rovati |
| 6,675,353 | B1 | | 1/2004 | Friedman |

(Continued)

FOREIGN PATENT DOCUMENTS

EP        0384184 A2      8/1990

(Continued)

OTHER PUBLICATIONS

Wong et al.; "Managing and Querying Multi-Version XML Data with Update Logging"; ACM 2002; pp. 76-77.*

(Continued)

*Primary Examiner*—William Bashore
*Assistant Examiner*—James J. Debrow
(74) *Attorney, Agent, or Firm*—Sidley Austin LLP

(57) ABSTRACT

Methods and apparatus for versioning an electronic document based on XML and methods and apparatus for providing an updated electronic document based on XML can use a version value. The electronic document being managed can use a syntax defining a structure of the structured electronic document. One method is characterized in that date information of when a content of the electronic document is changed is used as a version value.

30 Claims, 18 Drawing Sheets

U.S. PATENT DOCUMENTS

| | | | |
|---|---|---|---|
| 6,760,746 | B1 | 7/2004 | Schneider |
| 6,847,977 | B2 | 1/2005 | Abajian |
| 6,873,693 | B1 | 3/2005 | Langseth et al. |
| 6,877,002 | B2 | 4/2005 | Prince |
| 6,904,454 | B2 | 6/2005 | Stickler |
| 6,912,529 | B1 | 6/2005 | Kolfman |
| 6,941,300 | B2 | 9/2005 | Jensen-Grey |
| 7,085,755 | B2 | 8/2006 | Bluhm et al. |
| 2002/0143976 | A1 | 10/2002 | Barker et al. |
| 2002/0152244 | A1* | 10/2002 | Dean et al. ............ 707/530 |
| 2003/0009472 | A1* | 1/2003 | Azami et al. ............ 707/101 |
| 2003/0196165 | A1* | 10/2003 | Jung et al. ............ 715/501.1 |
| 2003/0197733 | A1* | 10/2003 | Beauchamp et al. ...... 345/764 |
| 2004/0015369 | A1* | 1/2004 | Kim et al. ............ 705/1 |
| 2004/0064481 | A1* | 4/2004 | Azami ............ 707/104.1 |
| 2005/0193408 | A1* | 9/2005 | Sull et al. ............ 725/32 |
| 2005/0193425 | A1 | 9/2005 | Sull et al. |

FOREIGN PATENT DOCUMENTS

| | | |
|---|---|---|
| EP | 1126707 | 8/2001 |
| JP | 9305622 | 11/1997 |
| JP | 2001186497 | 7/2001 |
| JP | 2001-337833 | 12/2001 |
| KR | 1020020058639 A | 7/2002 |
| WO | WO97/29591 | 8/1997 |
| WO | WO01/52117 | 7/2001 |
| WO | WO 01/55900 A1 | 8/2001 |
| WO | WO0155900 | 8/2001 |
| WO | WO 0195155 | 12/2001 |
| WO | WO 02/27520 A1 | 4/2002 |
| WO | WO0227520 | 4/2002 |
| WO | WO 02/063494 A2 | 8/2002 |
| WO | WO 02063494 | 8/2002 |
| WO | WO 2004/045209 A1 | 5/2004 |

OTHER PUBLICATIONS

Chien et al., "Efficient schemes for managing multiversion XML documents", Dec. 19, 2002, Spring-Verlag 2002, pp. 332-353.*

Hicks et al.,"A Hypermedia Version Control Framework",:ACM, Apr. 1998, pp. 127-160.*

Martinez et al,"A method for the dynamic generation of virtual versions of evolving documents", 2002, ACM, pp. 476-482.*

European Search Report for Application No. EP 03811141, dated Oct. 10, 2005, 4 pages.

Korean Office Action for Korean Application No. 10-2003-0025093, dated Jan. 20, 2006, 2 pages.

European Search Report for Application No. EP 03811141, dated Oct. 10, 2005, 4 pages.

Wong et al., "Managing and Querying Multi-Version XML Data with Update Logging," ACM, 2002, pp. 74-81.

Chien, "XML Document Versioning," Sep. 2001, Sigmod Record, vol. 30, No. 3, pp. 46-53.

J. Robie, "Combining and Querying XML Data with SQL," Dec. 1999, pp. 1-14, from internet: http://www.infoloom.com/gcaconfs/WEB/philadelphia99/robie.HTM.

Chinese Office Action for Chinese Application No. 03819565.8(PCT/KR2003/001705), dated Jun. 22, 2007, 22 pages.

Canadian Office Action for Canadian Application No. 2,506,060, dated Jun. 6, 2007, 1 page.

* cited by examiner

Fig.7

```
<?xml version="1.0" encoding="UTF-8"?>
<!ELEMENT Programs (Version, Contents?, Broadcasts?)>
<!ELEMENT Contents (Version, Content+)>
<!ELEMENT Content (Version, Title, ProgramID, Synopsis?)>
<!ELEMENT Version (#PCDATA)>
<!ELEMENT Title (#PCDATA)>
<!ELEMENT ProgramID (#PCDATA)>
<!ELEMENT Synopsis (#PCDATA)>
<!ELEMENT Broadcasts (Version, Broadcasts+)>
<!ELEMENT Broadcast (Version, ProgramID, Time, Duration, Service?)>
<!ELEMENT Time (#PCDATA)>
<!ELEMENT Duration (#PCDATA)>
<!ELEMENT Service (#PCDATA)>
```

Fig.8

```
<?xml version="1.0" encoding="UTF-8" ?>
<schema targetNamespace="http://www.sbs.co.kr"
        xmlns="http://www.w3.org/2001/XMLSchema"
        elementFormDefault="unqualified">
  <import namespace="http://www.w3c.org/XML/1998/namespace"
          schemaLocation="./xml-1998.xsd" />
  <element name="Programs">
    <complexType> <sequence>
      <element name="Version" type="string">
      <element name="Contents minOccurs="0">
        <complexType> <sequence>
          <element name="Version" type="string">
          <element name="Content" maxOccurs="unbounded">
            <complexType> <sequence>
              <element name="Version" type="string">
              <element name="Title"/>
              <element name="ProgramID"/>
              <element name="Synopsis" minOccurs="0">
            </sequence> </complexType> </element>
        </sequence> </complexType> </element>
      <element name="Broadcasts" minOccurs="0">
        <complexType> <sequence>
          <element name="Version" type="string">
          <element name="Broadcast" maxOccurs="unbounded">
            <complexType> <sequence>
              <element name="Version" type="string">
              <element name="ProgramID"/>
              <element name="Time" type="dateTime"/>
              <element name="Duration" type="dateTime"/>
              <element name="Service" minOccurs="0"/>
            </sequence> </complexType> </element>
        </sequence> </complexType> </element>
    </sequence> </complexType> </element>
</schema>
```

Fig.9

```xml
<?xml version="1.0" encoding="UTF-8" ?>
<Programs>
  <Version>20020407</Version>
  <Contents>
    <Version>20020407</Version>
    <Content>
      <Version>20020407</Version> <Title>Friends</Title>
      <ProgramID>KTLA-2002-0324</ProgramID> </Content>
    <Content>
      <Version>20020407</Version> <Title>Will & Grace</Title>
      <ProgramID>KTLA-2002-0391</ProgramID> </Content>
    <Content>
      <Version>20020407</Version> <Title>MAJOR LEAGUE BASEBALL</Title>
      <ProgramID>ESPN-2002-0114</ProgramID> </Content>
    <Content>
      <Version>20020407</Version> <Title> Sesame Street </Title>
      <ProgramID>KCET-2002-0115</ProgramID> </Content>
  </Contents>
  <Broadcasts>
    <Version>20020407</Version>
    <Broadcast>
      <Version>20020407</Version> <ProgramID>KTLA-2002-0324</ProgramID>
      <Time>2002-04-22 21:55</Time> <Duration>110m</Duration>
      <Service>KTLA</Service> </Broadcast>
    <Broadcast>
      <Version>20020407</Version> <ProgramID>KTLA-2002-0391</ProgramID>
      <Time>2002-04-29 21:55</Time> <Duration>70m</Duration>
      <Service>KTLA</Service> </Broadcast>
    <Broadcast>
      <Version>20020407</Version> <ProgramID>ESPN-2002-0114</ProgramID>
      <Time>2002-04-09 15:00</Time> <Duration>120m</Duration>
      <Service>ESPN</Service> </Broadcast>
    <Broadcast>
      <Version>20020407</Version> <ProgramID>KCET-2002-0115</ProgramID>
      <Time>2002-04-09 17:00</Time> <Duration>30m</Duration>
      <Service>KCET</Service> </Broadcast>
  </Broadcasts>
</Programs>
```

Fig.10

```
<?xml version="1.0" encoding="UTF-8" ?>
<Programs>
  <Version>20020407</Version>
  <Contents>
    <Version>20020407</Version>
    <Content>
      <Version>20020407</Version> <Title>Friends</Title>
      <ProgramID>KTLA-2002-0324</ProgramID> </Content>
    <Content>
      <Version>20020407</Version> <Title>Will & Grace</Title>
      <ProgramID>KTLA-2002-0391</ProgramID> </Content>
    <Content>
      <Version>20020407</Version> <Title> MAJOR LEAGUE BASEBALL </Title>
      <ProgramID>ESPN-2002-0114</ProgramID> </Content>
    <Content>
      <Version>20020407</Version> <Title>Sesame Street</Title>
      <ProgramID>KCET-2002-0115</ProgramID> </Content>
    <Content>
      <Version>20020408</Version> <Title>Larry King</Title>
      <ProgramID>CNN-2002-0394</ProgramID> </Content>
  </Contents>
  <Broadcasts>
  <Version>20020407</Version>
    <Broadcast>
      <Version>20020407</Version> <ProgramID>KTLA-2002-0324</ProgramID>
      <Time>2002-04-22 21:55</Time> <Duration>110m</Duration>
      <Service>KTLA</Service> </Broadcast>
    <Broadcast>
      <Version>20020407</Version> <ProgramID>KTLA-2002-0391</ProgramID>
      <Time>2002-04-29 21:55</Time> <Duration>70m</Duration>
      <Service>KTLA</Service> </Broadcast>
    <Broadcast>
      <Version>20020409</Version> <ProgramID>ESPN-2002-0114</ProgramID>
      <Time>2002-04-09 15:00</Time> <Duration>130m</Duration>
      <Service>ESPN</Service> </Broadcast>
    <Broadcast>
      <Version>20020409</Version> <ProgramID>KCET-2002-0115</ProgramID>
      <Time>2002-04-09 17:10</Time> <Duration>30m</Duration>
      <Service>KCET</Service> </Broadcast>
    <Broadcast>
      <Version>20020408</Version> <ProgramID>CNN-2002-0394</ProgramID>
      <Time>2002-04-19 00:55</Time> <Duration>60m</Duration>
      <Service>CNN</Service> </Broadcast>
  </Broadcasts>
</Programs>
```

Fig. 11

```
<?xml version="1.0" encoding="UTF-8" ?>
<Programs>
  <Version>20020409</Version>
  <Contents>
    <Version>20020409</Version>
    <Content>
      <Version>20020407</Version> <Title>Friends</Title>
      <ProgramID>KTLA-2002-0324</ProgramID> </Content>
    <Content>
      <Version>20020407</Version> <Title>Will & Grace</Title>
      <ProgramID>KTLA-2002-0391</ProgramID> </Content>
    <Content>
      <Version>20020407</Version> <Title> MAJOR LEAGUE BASEBALL </Title>
      <ProgramID>ESPN-2002-0114</ProgramID> </Content>
    <Content>
      <Version>20020407</Version> <Title>Sesame Street</Title>
      <ProgramID>KCET-2002-0115</ProgramID> </Content>
     <Content>
        <Version>20020408</Version> <Title>Larry King</Title>
        <ProgramID>CNN-2002-0394</ProgramID> </Content>
  </Contents>
  <Broadcasts>
    <Version>20020409</Version>
    <Broadcast>
      <Version>20020407</Version> <ProgramID>KTLA-2002-0324</ProgramID>
      <Time>2002-04-22 21:55</Time> <Duration>110m</Duration>
      <Service>KTLA</Service> </Broadcast>
    <Broadcast>
      <Version>20020407</Version> <ProgramID>LTLA-2002-0391</ProgramID>
      <Time>2002-04-29 21:55</Time> <Duration>70m</Duration>
      <Service>KTLA</Service> </Broadcast>
    <Broadcast>
      <Version>20020409</Version> <ProgramID>ESPN-2002-0114</ProgramID>
      <Time>2002-04-09 15:00</Time> <Duration>130m</Duration>
      <Service>ESPN</Service> </Broadcast>
    <Broadcast>
      <Version>20020409</Version> <ProgramID>KCET-2002-0115</ProgramID>
      <Time>2002-04-09 17:10</Time> <Duration>30m</Duration>
      <Service>KCET</Service> </Broadcast>
     <Broadcast>
        <Version>20020408</Version> <ProgramID>CNN-2002-0394</ProgramID>
        <Time>2002-04-19 00:55</Time> <Duration>60m</Duration>
        <Service>CNN</Service> </Broadcast>
  </Broadcasts>
</Programs>
```

Fig.12

```xml
<?xml version="1.0" encoding="UTF-8" ?>
<Programs>
  <Version>20020409.3</Version>
  <Contents>
    <Version>20020409.1</Version>
    <Content>
      <Version>20020407</Version> <Title>Friends</Title>
      <ProgramID>KTLA-2002-0324</ProgramID> </Content>
    <Content>
      <Version>20020407</Version> <Title>Will & Grace</Title>
      <ProgramID>KTLA-2002-0391</ProgramID> </Content>
    <Content>
      <Version>20020407</Version> <Title> MAJOR LEAGUE BASEBALL </Title>
      <ProgramID>ESPN-2002-0114</ProgramID> </Content>
    <Content>
      <Version>20020407</Version> <Title>Sesame Street</Title>
      <ProgramID>KCET-2002-0115</ProgramID> </Content>
    <Content>
      <Version>20020408</Version> <Title>Larry King</Title>
      <ProgramID>CNN-2002-0394</ProgramID> </Content>
  </Contents>
  <Broadcasts>
    <Version>20020409.1</Version>
    <Broadcast>
      <Version>20020407</Version> <ProgramID>KTLA-2002-0324</ProgramID>
      <Time>2002-04-22 21:55</Time> <Duration>110m</Duration>
      <Service>KTLA</Service> </Broadcast>
    <Broadcast>
      <Version>20020407</Version> <ProgramID>KTLA-2002-0391</ProgramID>
      <Time>2002-04-29 21:55</Time> <Duration>70m</Duration>
      <Service>KTLA</Service> </Broadcast>
    <Broadcast>
      <Version>20020409</Version> <ProgramID>ESPN-2002-0114</ProgramID>
      <Time>2002-04-09 15:00</Time> <Duration>130m</Duration>
      <Service>ESPN</Service> </Broadcast>
    <Broadcast>
      <Version>20020409</Version> <ProgramID>KCET-2002-0115</ProgramID>
      <Time>2002-04-09 17:10</Time> <Duration>30m</Duration>
      <Service>KCET</Service> </Broadcast>
    <Broadcast>
      <Version>20020408</Version> <ProgramID>CNN-2002-0394</ProgramID>
      <Time>2002-04-19 00:55</Time> <Duration>60m</Duration>
      <Service>CNN</Service> </Broadcast>
  </Broadcasts>
</Programs>
```

Fig. 13

```
<?xml version="1.0" encoding="UTF-8" ?>
<Programs>
  <Version>20020407</Version>
  <Contents>
    <Version>20020407</Version>
    <Content>
      <Version>20020408</Version>
      <Title>Larry King</Title>
      <ProgramID>CNN-2002-0394</ProgramID>
    </Content>
  </Contents>
  <Broadcasts>
  <Version>20020407</Version>
    <Broadcast>
      <Version>20020409</Version>
      <ProgramID>ESPN-2002-0114</ProgramID>
      <Time>2002-04-09 15:00</Time>
      <Duration>130m</Duration>
      <Service>ESPN</Service>
    </Broadcast>
    <Broadcast>
      <Version>20020409</Version>
      <ProgramID>KCET-2002-0115</ProgramID>
      <Time>2002-04-09 17:10</Time>
      <Duration>30m</Duration>
      <Service>KCET</Service>
    </Broadcast>
    <Broadcast>
      <Version>20020408</Version>
      <ProgramID>CNN-2002-0394</ProgramID>
      <Time>2002-04-19 00:55</Time>
      <Duration>60m</Duration>
      <Service>CNN</Service>
    </Broadcast>
  </Broadcasts>
</Programs>
```

Fig.14

```xml
<?xml version="1.0" encoding="UTF-8" ?>
<Programs>
  <Version>20020409</Version>
  <Contents>
    <Version>20020409</Version>
    <Content>
      <Version>20020408</Version>
      <Title>Larry King</Title>
      <ProgramID>CNN-2002-0394</ProgramID>
    </Content>
  </Contents>
  <Broadcasts>
    <Version>20020409</Version>
    <Broadcast>
      <Version>20020409</Version>
      <ProgramID>ESPN-2002-0114</ProgramID>
      <Time>2002-04-09 15:00</Time>
      <Duration>130m</Duration>
      <Service>ESPN</Service>
    </Broadcast>
    <Broadcast>
      <Version>20020409</Version>
      <ProgramID>KCET-2002-0115</ProgramID>
      <Time>2002-04-09 17:10</Time>
      <Duration>30m</Duration>
      <Service>KCET</Service>
    </Broadcast>
    <Broadcast>
      <Version>20020408</Version>
      <ProgramID>CNN-2002-0394</ProgramID>
      <Time>2002-04-19 00:55</Time>
      <Duration>60m</Duration>
      <Service>CNN</Service>
    </Broadcast>
  </Broadcasts>
</Programs>
```

Fig.15

```
<?xml version="1.0" encoding="UTF-8" ?>
<Programs>
   <Version>20020407</Version>
   <Broadcasts>
   <Version>20020407</Version>
     <Broadcast>
       <Version>20020409</Version>
       <ProgramID>ESPN-2002-0114</ProgramID>
       <Time>2002-04-09 15:00</Time>
       <Duration>130m</Duration>
       <Service>ESPN</Service>
     </Broadcast>
     <Broadcast>
       <Version>20020409</Version>
       <ProgramID>KCET-2002-0115</ProgramID>
       <Time>2002-04-09 17:10</Time>
       <Duration>30m</Duration>
       <Service>KCET</Service>
     </Broadcast>
     <Broadcast>
       <Version>20020408</Version>
       <ProgramID>CNN-2002-0394</ProgramID>
       <Time>2002-04-19 00:55</Time>
       <Duration>60m</Duration>
       <Service>CNN</Service>
     </Broadcast>
   </Broadcasts>
</Programs>
```

Fig.16

```
<?xml version="1.0" encoding="UTF-8" ?>
<Programs>
  <Version>20020409</Version>
  <Broadcasts>
    <Version>20020409</Version>
    <Broadcast>
      <Version>20020409</Version>
      <ProgramID>ESPN-2002-0114</ProgramID>
      <Time>2002-04-09 15:00</Time>
      <Duration>130m</Duration>
      <Service>ESPN</Service>
    </Broadcast>
    <Broadcast>
      <Version>20020409</Version>
      <ProgramID>KCET-2002-0115</ProgramID>
      <Time>2002-04-09 17:10</Time>
      <Duration>30m</Duration>
      <Service>KCET</Service>
    </Broadcast>
    <Broadcast>
      <Version>20020408</Version>
      <ProgramID>CNN-2002-0394</ProgramID>
      <Time>2002-04-19 00:55</Time>
      <Duration>60m</Duration>
      <Service>CNN</Service>
    </Broadcast>
  </Broadcasts>
</Programs>
```

Fig. 17

```xml
<?xml version="1.0" encoding="UTF-8"?>
<Invalid>
  <Programs>
    <Broadcast>
      <Version>20020110</Version>
      <ProgramID>CNN-2002-0394</ProgramID>
    </Broadcast>
  </Programs>
</Invalid>
<Programs>
  <Version>20020407</Version>
  <Broadcasts>
  <Version>20020407</Version>
    <Broadcast>
      <Version>20020409</Version>
      <ProgramID>ESPN-2002-0114</ProgramID>
      <Time>2002-04-09 15:00</Time>
      <Duration>130m</Duration>
      <Service>ESPN</Service>
    </Broadcast>
    <Broadcast>
      <Version>20020409</Version>
      <ProgramID>KCET-2002-0115</ProgramID>
      <Time>2002-04-09 17:10</Time>
      <Duration>30m</Duration>
      <Service>KCET</Service>
    </Broadcast>
    <Broadcast>
      <Version>20020408</Version>
      <ProgramID>CNN-2002-0394</ProgramID>
      <Time>2002-04-19 00:55</Time>
      <Duration>60m</Duration>
      <Service>CNN</Service>
    </Broadcast>
  </Broadcasts>
</Programs>
```

Fig. 18

```xml
<?xml version="1.0" encoding="UTF-8"?>
<Invalid>
  <Programs>
    <Broadcast>
        <Version>20020110</Version>
        <ProgramID>CNN-2002-0394</ProgramID>
    </Broadcast>
  </Programs>
</Invalid>
<Programs>
  <Version>20020409</Version>
  <Broadcasts>
  <Version>20020409</Version>
    <Broadcast>
        <Version>20020409</Version>
        <ProgramID>ESPN-2002-0114</ProgramID>
        <Time>2002-04-09 15:00</Time>
        <Duration>130m</Duration>
        <Service>ESPN</Service>
    </Broadcast>
    <Broadcast>
        <Version>20020409</Version>
        <ProgramID>KCET-2002-0115</ProgramID>
        <Time>2002-04-09 17:10</Time>
        <Duration>30m</Duration>
        <Service>KCET</Service>
    </Broadcast>
     <Broadcast>
        <Version>20020408</Version>
        <ProgramID>CNN-2002-0394</ProgramID>
        <Time>2002-04-19 00:55</Time>
        <Duration>60m</Duration>
        <Service>CNN</Service>
    </Broadcast>
  </Broadcasts>
</Programs>
```

ELECTRONIC DOCUMENT VERSIONING METHOD AND UPDATED DOCUMENT SUPPLY METHOD USING VERSION NUMBER BASED ON XML

CROSS REFERENCE TO RELATED APPLICATION

The present application is a continuation of co-pending application Ser. No. 10/705,915, filed Nov. 13, 2003, the entirety of which is incorporated by reference herein.

BACKGROUND OF THE INVENTION

1. Field of the Invention

The present invention relates to an electronic document request/supply method, and more particularly, to an XML-based electronic document request/supply method.

2. Background of the Related Art

In recent years, an extensible markup language (hereinafter, referred to as "XML") is widely used to create electronic documents. The utilization of XML increases rapidly throughout the world, and government and public offices as well as general enterprises are increasingly introducing the XML. These electronic documents are generally created on the basis of a syntax prescribed by each organization.

XML-based electronic documents are often managed in a client/server structure that stores the documents in the server and provides desired electronic documents according to the user's request. Such a client/server structure is illustrated in FIG. 1.

FIG. 1 is a schematic view of the client/server structure that requests/supplies a general XML-based electronic document. As shown in FIG. 1, the client is a document requester/user side and the server is a document provider side. Accordingly, if a system requesting and using a document has functions of storing and providing the document at the same time, the system can simultaneously act as the client and the server according to its role.

A language fox searching XML documents includes XML query language (XQL) and XQuery. These search languages are widely used to search XML documents stored in an electronic document repository of the server and accept/provide a result in a form of XML document desired by the requester.

However, the related art XML electronic document request/supply methods and apparatus have various disadvantages. In a related art system that provides a document in accordance with a user's request, there does not exist a separate expression method for notifying only of the modified or added content of a document. Hence, in order to provide information on the modified or added content of the document, the related art system has a drawback in that it has to send the overall content of the document containing the repeated content (e.g., unchanged) which was initially sent.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide an electronic document versioning method and/or document update transmission method based on XML using version numbers that substantially obviates one or more problems caused by limitations and disadvantages of the related art.

Another object of the present invention to provide an electronic document versioning method that enhances transmission efficiency of an electronic document transmission method on XML.

Another object of the present invention to provide an electronic document versioning method that is capable of gradual updating of an electronic document transmitted using XML.

Another object of the present invention to provide an electronic document versioning method in which at least one of date information and date with time information of a modified structure of the structured electronic document are used as version values.

Another object of the present invention is to provide an electronic document versioning method that is capable of changing a version value of a lower structure when the content of the lower structure is changed by correction or addition and capable of reflecting where such changes in a version value of a corresponding upper structure that includes the changed lower structure.

Another object of the present invention is to provide an electronic document versioning method that is capable of changing a version value of an upper structure so that the version value of the upper structure can determine the one or more corresponding lower structures that have changed.

Another object of the present invention is to provide an updated document supply method based on XML in which a provider sends not the overall content of the document but only the added or changed content by using a version value.

Another object of the present invention is to provide a document supply method based on XML in which identifier information on the electronic document can be used together with version values to distinguish the electronic document using the version values when the identifier information value is used again.

To achieve at least the above objects and other advantages in a whole or in part and in accordance with the purpose of the invention, as embodied and broadly described herein, there is provided a method for versioning an electronic document based on XML, the electronic document being managed using a syntax defining a structure of the structured electronic document, the method includes identifying a structure of an electronic document, and using date information of when a structure content of the electronic document is changed as a version value.

To further achieve the above objects and advantages in a whole or in part and in accordance with the present invention, there is provided a method for versioning an electronic document based on XML, the electronic document being managed using a syntax defining a structure of the structured electronic document, the method includes determining contents of an electronic document defined by the syntax, and using date and time information of when a content of the electronic document is changed as a version value.

To further achieve the above objects and advantages in a whole or in part and in accordance with the present invention, there is provided a method for requesting an electronic document based on XML, the electronic document being managed using a syntax defining a structure of the structured electronic document, the method includes identifying a version value of an electronic document, and requesting an updated information of the electronic document using the version value as a condition.

To further achieve the above objects and advantages in a whole or in part and in accordance with the present invention, there is provided a method for providing an updated electronic document based on XML, the electronic document being managed using a syntax defining a structure of the structured electronic document, the method includes identifying a version value of an electronic document, wherein the version value determines at least one of date and time information of a changed content of the electronic document, and providing an updated information of the electronic document using the version value as a condition.

To further achieve the above objects and advantages in a whole or in part and in accordance with the present invention, there is provided a method for processing an electronic document using a version based on XML, the electronic document being managed using a syntax defining a structure of the structured electronic document, the method includes providing an identifier for an electronic document, and providing a version value for the electronic document in which at least one of date information and date with time information of when a content of the electronic document is changed are used as the version value of the corresponding electronic document, wherein the version value is used to distinguish two electronic documents having the same identifier.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 7 is a diagram of an exemplary DTD showing a syntax of a broadcast program produced by an XML-based electronic document creating method to which an electronic document versioning method according to the present invention is applied;

FIG. 8 is a diagram of an exemplary XML schema showing a syntax of a broadcast program electronic document produced by an XML-based electronic document creating method to which an electronic document versioning method according to the present invention is applied;

FIG. 9 is a diagram of an exemplary broadcast program electronic document produced by an XML based electronic document creating method to which an electronic document versioning method according to the present invention is applied;

FIG. 10 is a diagram showing an exemplary current state program electronic document using a preferred embodiment of a method for versioning an XML-based electronic document according to the present invention;

FIG. 11 is a diagram showing an exemplary current state program electronic document using another preferred embodiment of a method for versioning an XML-based electronic document according to the present invention;

FIG. 12 is a diagram showing an exemplary current state program electronic document using yet another method for versioning an XML-based electronic document according to the present invention;

FIG. 13 is a diagram showing an exemplary updated electronic document provided according to 'request 1' in a system a using a preferred embodiment of a method for versioning an XML-based electronic document according to the present invention;

FIG. 14 is a diagram showing an exemplary updated electronic document provided according to 'request 1' in a system using additional preferred embodiments of methods for versioning an XML-based electronic document according to the present invention;

FIG. 15 is a diagram showing an exemplary updated electronic document provided according to 'request 2' in a system using a preferred embodiment of a method for versioning an XML-based electronic document according to the present invention;

FIG. 16 is a diagram showing an exemplary updated electronic document provided according to 'request 2' in a system using additional preferred embodiments of methods for versioning an XML-based electronic document according to the present invention;

FIG. 17 is a diagram showing an exemplary updated electronic document provided according to 'request 2' with an identifier and a system using a preferred embodiment of a method for versioning an XML-based electronic document according to the present invention; and FIG. 18 is a diagram showing an exemplary updated electronic document provided according to 'request 2' with a system using an identifier and additional preferred embodiments of methods for versioning an XML-based electronic document according to the present invention.

DETAILED DESCRIPTION OF PREFERRED EMBODIMENTS

Figure 1:
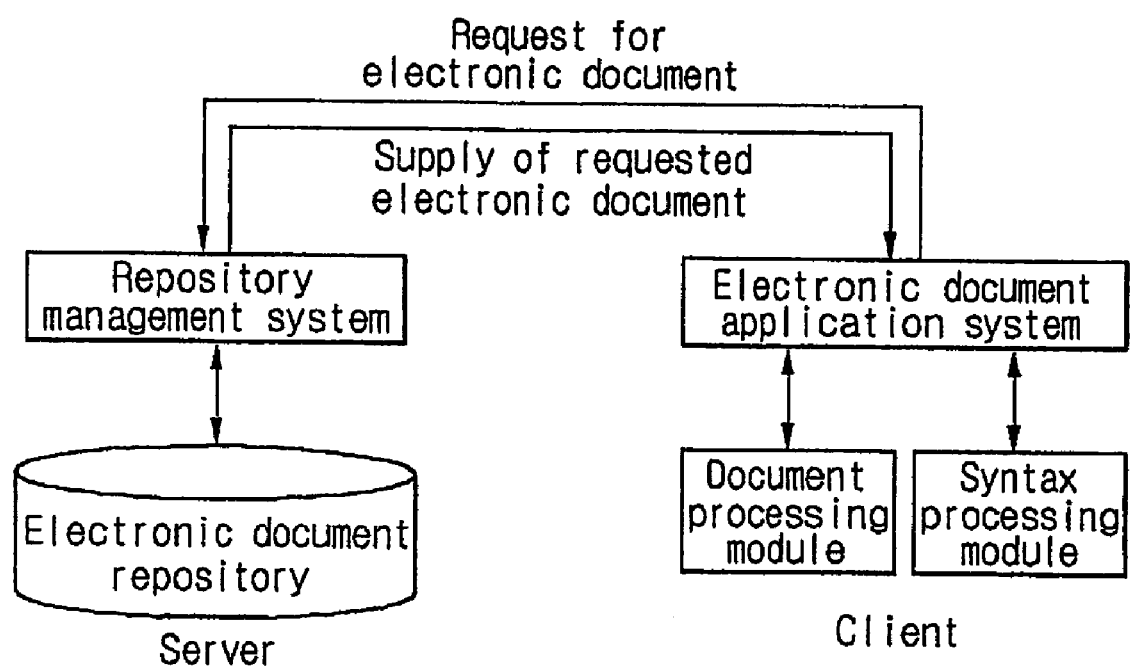
FIG. 1 is a schematic view of a related art client/server structure that requests/supplies an XML-based electronic document.

Embodiments of an electronic document versioning method and embodiments of a document supply method using a version number based on an XML according to the present invention will now be described. XML based electronic documents can define syntaxes using a document type definition (DTD) or an XML schema language. These syntaxes define a structure of an entire electronic document and restrict name and occurrence frequency of each element, order, whether it is an essential element or an optional element, attribute of each element, etc. The electronic documents become valid documents with respect to the syntaxes created by these languages. According to embodiments of the present invention, versions assigned to the electronic document can correspond to the element, attribute or the like.

Embodiments of the present invention disclose methods and apparatus whereby a provider can manage updated information of document depending on time using a prescribed version, element/attribute value of the syntax. Also according to embodiments of the present invention, a requester can request documents after a prescribed version value of a selected document provided to the requester from a repository. The requester intends to be supplied with the electronic documents after the version value so that the prescribed version value is used as a condition.

Further, an identifier of an electronic document is re-used later or after a certain time period. Embodiments according to the present invention can provide a way to identify a previous document having the identifier from a new or updated document.

Identifier information can be the only identification information capable of identifying a specific document. However, the range of the identifier information is limited. Accordingly, the identifier information is preferably orderly used from a first or minimum value. The life span of the allotted identifier value becomes a period in which all values in the identifier range (e.g., to the last or maximum value) are used.

In a case where the number of electronic documents is increased and thus the identifier information is used to the maximum value of its range, circulation is again repeated (e.g., continued re-using the identifier information) using the identifier information allotted to an invalid electronic document. In other words, an identifier value that is no longer valid as it reaches the identifier circulation period, can be again used in a new document.

Thus, there is a need of discrimination between an old document and a new document having the same identifier value for reasons such as document management and the like. It is possible to discriminate two such documents by the version value, for example using the latest correction date and time information, according to embodiments of the invention. That is, the two documents can be discriminated by using the latest correction date/time together.

Embodiments of XML-based electronic document request/supply method can be applied, for example, to systems including a requester who requests to be provided an electronic document, a provider that provides the requested electronic document, and a network coupled between the requester and the provider. Also, methods can be applied to a system that provides only a part of a basic information in an environment such as a broadcast program supply system, and then supplies updated information according to user's necessity or request.

Three methods for versioning an electronic document based on XML will now be described. However, the present invention is not intended to be so limited.

Figure 2:
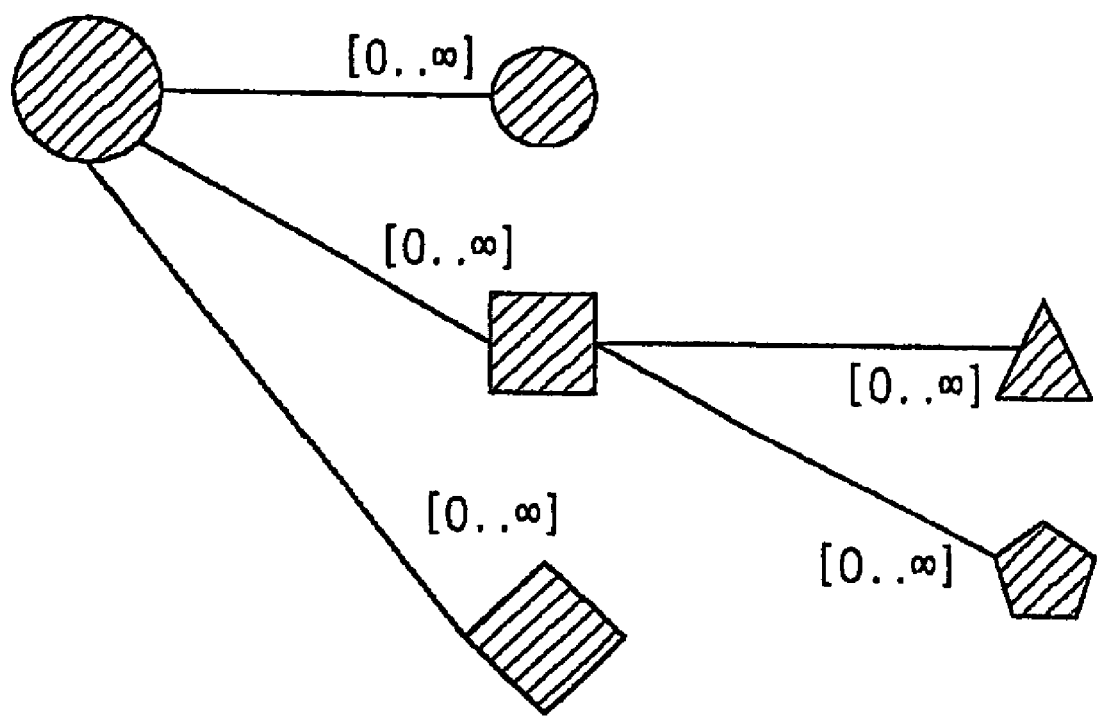
FIG. 2 is a diagram schematically showing an exemplary method of creating an XML-based electronic document.

FIG. 2 is a diagram schematically showing a general method of creating the XML-based electronic document. As shown in FIG. 2, each parenthesis is indicative of a number of lower structures that can be transited to upper structure. In order to consider all possible cases, it is assumed that zero (0) to infinity structures are respectively possible.

Figure 3:
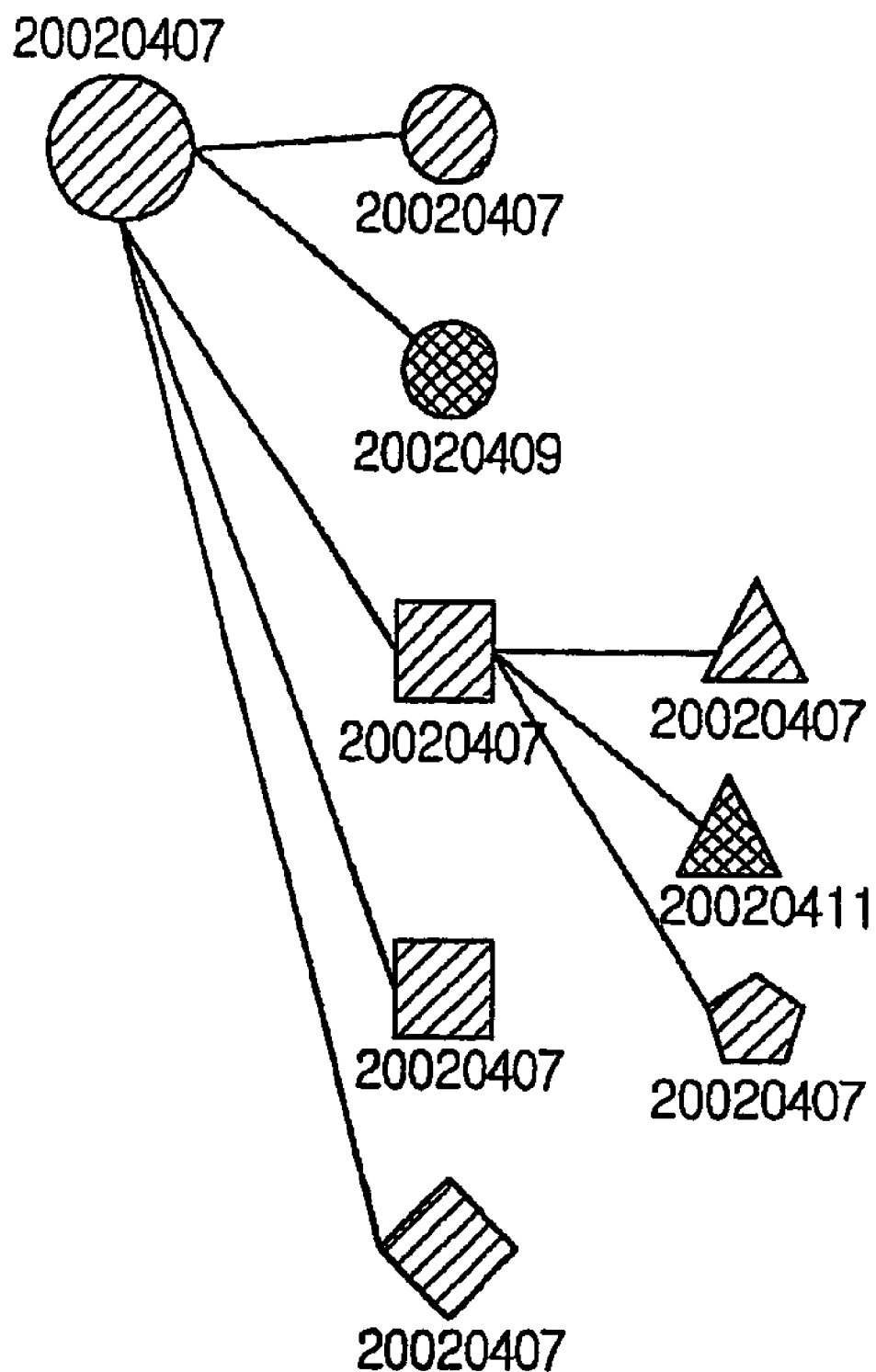
FIG. 3 is a diagram schematically showing a preferred embodiment of a method for versioning an XML-based electronic document according to the present invention.

A first embodiment of a method for versioning the electronic document based on XML according to the present invention uses date information at which content of document is added or corrected as a version value. Further, a value including the date with time information can be used as the version value, however, only the date information would be sufficient for the version value. FIG. 3 is a diagram showing the first embodiment of a method for versioning the XML-based electronic document used in FIG. 2 according to the present invention.

Figure 4:
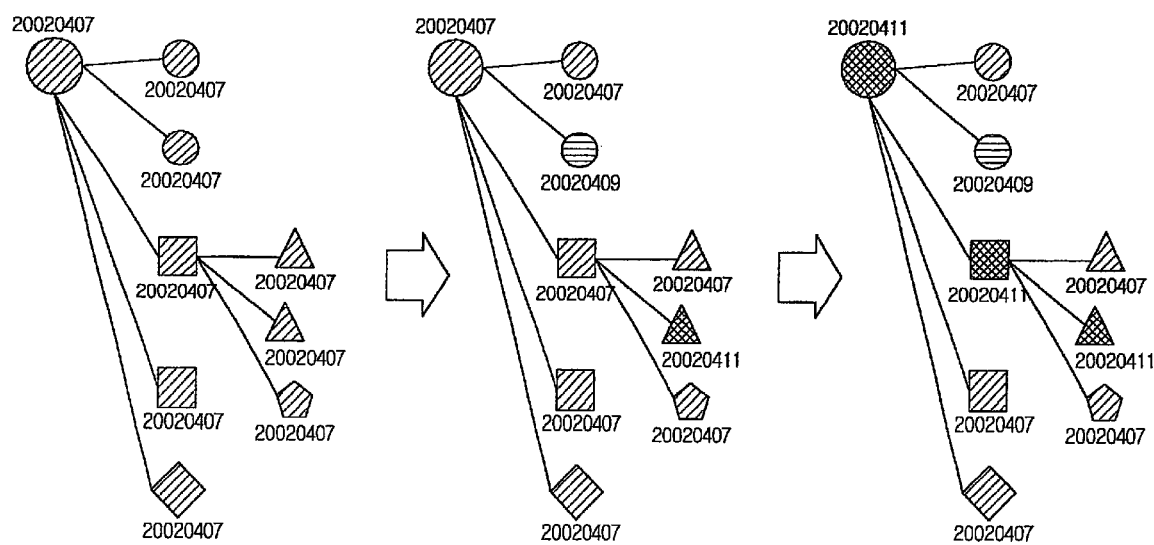
FIG. 4 is a diagram schematically showing another preferred embodiment of a method for versioning an XML-based electronic document according to the present invention.

A second embodiment of a method for versioning the electronic document based on XML according to the present invention, when a version value of lower structure is corrected, a version value of an upper structure is changed to the latest information (e.g., most recently changed) among the version values of corresponding lower structures. In the second embodiment of a method, the version value can be similar to the first embodiment of a method for versioning the electronic document based on XML. FIG. 4 is a diagram schematically showing the second embodiment of a method for versioning the XML-based electronic document of FIG. 2 according to the present invention. As shown in FIG. 4, the latest value among the version values of the lower structure becomes the version value of the upper structure.

Figure 5:
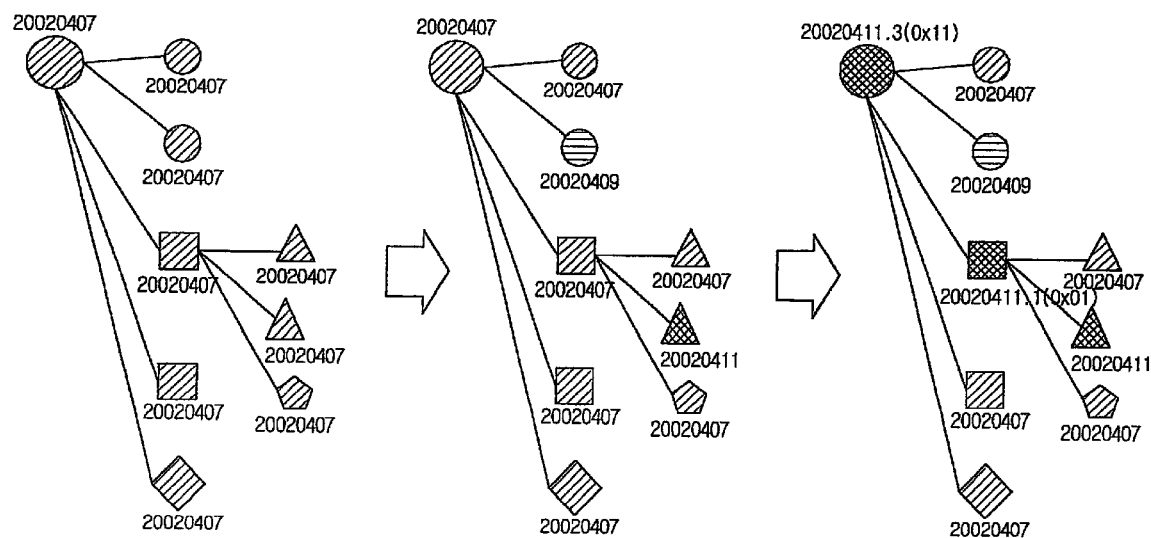
FIG. 5 is a diagram schematically showing yet another preferred embodiment of a method for versioning an XML-based electronic document according to the present invention.

According to a third embodiment of a method for versioning the electronic document based on XML according to the present invention, a version value of an upper structure indicates which (e.g., or whether an arbitrary type) lower structure is corrected or added. According to the third versioning method, if there are multiple lower structures, changed type can be easily or directly retrieved using version values to thereby decrease the retrieval time. In the third embodiment of a method, a version value can be similar to the second embodiment of a method for versioning the electronic document based on XML. FIG. 5 is a diagram schematically showing a third embodiment of a method for versioning the 334 L-based electronic document of FIG. 2 according to the present invention.

For example, as shown in FIG. 5, a lower structure type can be expressed by a bit masking method using a bit masking value such as decimal or hexadecimal. However, the present invention is not intended to be so limited as other version values instead of bit masking values and others can be used that are sufficient to supplement the basic information such as the date information or date with time information with an identification of the possible corresponding lower structure types. Further, the provider can use the bit masking according to the third embodiment of a method for the purpose of inner management, and can provide a value except for the bit masking information as a version value when the provider provides a requester with a document or a requested document update.

Figure 6:
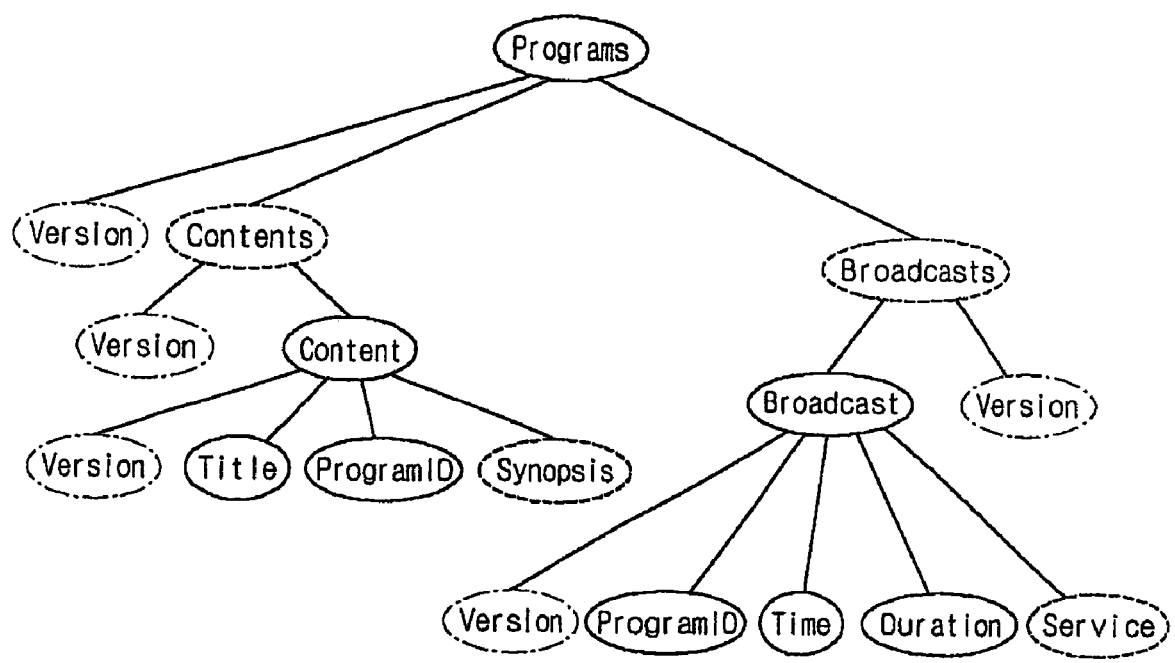
FIG. 6 is a diagram showing an exemplary syntax structure of a broadcast program produced by an XML-based electronic document creating method to which an electronic document versioning method according to the present invention is applied.

As one example application, the syntax of electronic document regarding a broadcast program is defined as follows, and application cases of an electronic document versioning method and an electronic document updating method based on XML will now be described. FIG. 6 is a diagram showing an exemplary syntax structure of a broadcast program created by the XML-based electronic document creating method to which embodiments of the electronic document versioning method according to the present invention is applied.

Broadcast programs can have information such as 'version', 'broadcast contents' and 'broadcast schedules'. It is assumed that Broadcast contents' have a list on 'version' and 'broadcast content', and 'broadcast content' has information on program contents such as 'version', 'title', a sole 'program identifier' indicating program, synopsis and the like. In addition, it is assumed that 'broadcast schedules' have a list on 'version' and 'broadcast schedule', and 'broadcast schedule' has broadcast-related information such as 'version', a sole 'program identifier' indicating program, 'broadcast company', 'broadcast time', 'broadcast duration' and the like. Schema of these syntaxes is shown in FIG. 6.

Exemplary broadcast program syntaxes can be created as shown in FIGS. 7 and 8. FIG. 7 is a diagram showing an exemplary DTD showing the syntax of the broadcast program created by an XML-based electronic document creating method to which the electronic document versioning method according to embodiments of the present invention is applied, and FIG. 8 is a diagram showing an exemplary XML schema showing the syntax of a broadcast program electronic document produced by the XML-based electronic document creating method to which the electronic document versioning method according to embodiments of the present invention is applied.

The version value may use a type of 'dateTime' because it uses date information. However, the version value can be defined in a type of 'string', 'integer', 'float' and the like according to the versioning and the application supplied, and then can be type-converted into other types for use. In FIG. 8, the type of 'string' is used for the three electronic document versioning methods according embodiments of the present invention.

FIGS. 9, 10, 11 and 12 show the broadcast program documents substantially created depending upon these syntaxes, and show examples of the broadcast program electronic documents created by a XML-based electronic document creating method using the electronic document versioning method according to embodiments of the present invention. FIG. 9 is a diagram illustrating an exemplary initial document structure. FIGS. 10, 11 and 12 ate diagrams illustrating a current state document structure into which the document structure of FIG. 9 is respectively modified using three embodiments of electronic document versioning methods.

It is assumed that, after receiving program information of FIG. 9, the requester requests program information having the modified content up to a current requesting line by using the version value of FIG. 9. In the above circumstance, the requester can request all updated information using the version value ('request 1'), or can request only updated information for a specific structure 'broadcast schedule' ('request 2'). Such request conditions in each case for three embodiments of electronic document versioning methods can be as follows:

'request 1': 'version'≧20020407
'request 2': 'broadcast programs/broadcast schedules/broadcast schedule/version'≧20020407.

As shown in FIGS. 13, 14, 15 and 16, for 'request 1' and 'request 2', respectively, the electronic document repository can provide the electronic document application system used by the user, with the updated electronic document, according to the prescribed syntax.

For 'request 1', the updated electronic document provided by the first embodiment of the electronic document versioning method is shown in FIG. 13, and the updated electronic document provided by the second and third embodiments of the electronic document versioning methods is shown in FIG. 14. At this time, since the bit masking (e.g., modified lower structure selector) in the third electronic document versioning method is information that the provider can have internally, the electronic documents provided through the second and third embodiments of electronic document versioning methods can become identical with each other.

Further, for 'request 2', the updated electronic document provided through the first embodiment of electronic document versioning method is shown in FIG. 15. The updated electronic document provided through the second and third embodiments of electronic document versioning methods is shown in FIG. 16.

In a case where two programs coexist at almost same time because of the short life span of the identifier, there is a need for sending information that the previous program is not valid any more. In this case, by providing both of the version value and the identifier value of the invalid document, the requester can discriminate the invalid document having the consistent identifier value from the documents using the previous version values. Accordingly, the requester can use a new document having the identifier value identical with that of the previous document.

For 'request 2', FIGS. 17 and 18 show an example of the document with information on no-longer-valid programs being included in an element <invalid>. FIG. 17 is a diagram illustrating an example of the updated electronic document provided according to 'request 2' in a system using the first embodiment of electronic document versioning method based on XML and identifier according to the present invention. FIG. 18 is a diagram illustrating an example of the updated electronic document provided according to 'request 2' in a system using the second and third embodiments of electronic document versioning methods and the identifier according to the present invention.

In expressing a previous document having the identifier value 'CNN-2002-0394' of a newly added document to be no longer valid, the previous document is expressed by a version value of '20020110', which corresponds to a earlier (e.g., less) date than the latest modified date of the previous document or an initial creation date of the new document. Accordingly, so that the previous document can be discriminated from the new document having the same identifier value.

Thus, in electronic document versioning methods based on XML and the updated document supply method using the version according to embodiments of the present invention, only updated information among the contents information of the document is supplied, and the updated information is reflected on the documents, for example being used by the requester. Thus, it becomes possible to gradually update the document. Further, in a case where the identifier is reused, the version value based upon the embodiments of versioning methods of the invention can make it possible to discriminate between the new document and the previous document using the same identifier.

As described, embodiments of methods and apparatus for electronic document supply/request and transmission have various advantages. According to embodiments of XML-based electronic document versioning methods, a provider uses date and time information of modified structures as a version value in the provider's management on the structured electronic document so that the documents can be efficiently managed by using the version value. Further, according to embodiments of XML-based electronic document versioning methods, when the version value of the lower structure is changed by any correction or addition, the changed version value of the lower structure is reflected on the version value of the upper structure. Further, the modified or added lower structure can be retrieved by the version value. Also according to embodiments of electronic document versioning methods and updated document supply method using the version number based on the XML, since the provider separately transmits only contents that should be added or modified, an amount of transmission can be reduced and the requester can update the contents (e.g., only modified contents) of the previous document. In addition, according to embodiments of document supply methods using the version value based on the XML according to the present invention, when the identifier is reused, the new electronic document and the previous document having the same identifier can be discriminated using the version value.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method implemented by an apparatus for managing metadata related to broadcasting multimedia content, the method comprising:
storing an electronic document related to broadcasting a plurality of television programs, the electronic document having a hierarchical structure comprising an upper structural element and a plurality of lower structural elements located below the upper structural element in the hierarchical structure to describe broadcast information and content information for each of the television programs, a first lower structural element in the plurality of lower structural elements having a first version of metadata, wherein the first lower structural element is identified by a first element identifier and the first version of metadata is identified by a first version identifier corresponding to a first calendar date for the first version;
reassigning the first element identifier to another element in the electronic document at a second calendar date;
receiving a request from a client for an update of the electronic document after the second calendar date; and
in response to the request, providing an update document to the client, the update document including a first update portion identifying invalid elements and a second update portion that includes the upper structural element and updates to a subset of the lower structural elements, wherein the first update portion includes the first element identifier and a second version identifier to indicate that metadata in the first lower structural element is no longer valid, wherein the second version identifier corresponds to the first or second calendar date.

2. The method of claim 1, wherein the electronic document is in XML format.

3. The method of claim 1, wherein each of the first and second version identifiers is a numerical representation of the corresponding calendar date.

4. The method of claim 1, wherein each of the first and second version identifiers is expressed in the form of YYYYMMDD, wherein YYYY, MM, and DD are numerical expressions of year, month, and day, respectively.

5. The method of claim 1, wherein each of the first and second version identifiers includes information about the time at which the respective version was created.

6. The method of claim 1, wherein the first lower structural element has the first version of metadata that includes at least one of title, synopsis, review, and cast for a first television program in the plurality of television programs.

7. The method of claim 1, further comprising updating the stored electronic document after reassigning the first element identifier.

8. The method of claim 1, wherein the second update portion specifies a third version identifier for the upper structural element.

9. The method of claim 8, wherein the third version identifier for the upper structural element specifies a third calendar date that is earlier than the first calendar date.

10. The method of claim 8, wherein the subset of the lower structural elements have version identifiers defining a latest calendar date, and the third version identifier for the upper structural element specifies the latest calendar date.

11. A method implemented by an apparatus for updating metadata related to broadcasting multimedia content, wherein the metadata is in XML format, the method comprising:
receiving a request for an update to an electronic document from a client device storing an earlier version of the electronic document, wherein the electronic document is related to broadcasting a plurality of television programs and has a hierarchical structure comprising an upper structural element and a plurality of lower structural elements located below the upper structural element in the hierarchical structure to describe broadcast information and content information for each of the television programs, and wherein a first lower structural element in the earlier version is identified by a first element identifier and a first version identifier which is a numerical representation of a first calendar date on which the earlier version was created; and
if the first element identifier is reassigned to another element in the electronic document, providing an update document to the client device, the update document including a first update portion identifying invalid elements and a second update portion that includes the upper structural element and updates to a subset of the lower structural elements, wherein the first update portion includes the first element identifier and a second version identifier to indicate that the first lower structural element is no longer valid, wherein the second version identifier is a numerical representation of the first calendar date or a second calendar date which is related to an updated version of the electronic document.

12. The method of claim 11, wherein each of the first and second version identifiers is expressed in the form of YYYYMMDD, wherein YYYY, MM, and DD are numerical expressions of year, month, and day, respectively.

13. The method of claim 11, wherein each of the first and second version identifiers includes information about the time at which the respective version was created.

14. The method of claim 11, wherein the first lower structural element includes at least one of title, synopsis, review, and cast for a first television program in the plurality of television programs.

15. The method of claim 11, further comprising changing at least one version identifier in the electronic document stored at the client device into a new version identifier.

16. A method implemented by an apparatus for managing metadata related to broadcasting multimedia content, the method comprising:
providing an electronic document related to broadcasting a plurality of television programs to a client, the electronic document having a hierarchical structure comprising an upper level fragment associated with an initial version of a plurality of lower level fragments located below the upper level fragment in the hierarchical structure, wherein the upper level fragment and the lower level fragments describe broadcast information and content information for each of the television programs, wherein the upper level fragment is identified by a first version identifier corresponding to a calendar date for the upper level fragment and the initial version of a first lower level fragment in the plurality of lower level fragments is identified by a first fragment identifier and a second version identifier corresponding to a calendar date for the initial version;
reassigning the first fragment identifier to another element in the electronic document at a calendar date corresponding to the reassignment;

receiving a request from the client for an update to the initial version of the lower level fragment after the reassignment; and in response to the request, providing an update document to the client, the update document including a first update portion identifying invalid elements and a second update portion that includes the upper level fragment and an updated version of a subset of the lower level fragments, wherein the first update portion includes the first fragment identifier and a third version identifier to indicate that the first lower level fragment is no longer valid, and wherein the updated version of the subset of the lower level fragments is identified by a fourth version identifier corresponding to a calendar date for the updated version.

17. The method of claim 16, further comprising changing the first version identifier of the upper level fragment after the updated version of the subset of the lower level fragments has been provided.

18. The method of claim 17, wherein the first version identifier of the upper level fragment is changed based on the fourth version identifier of the updated version of the subset of the lower level fragments.

19. The method of claim 16, wherein at least one of the version identifiers includes a numerical representation of the corresponding calendar date.

20. The method of claim 16, wherein each of the version identifiers is a numerical representation of a calendar date on which the respective version was created.

21. The method of claim 16, wherein each version identifier is expressed in the form of YYYYMMDD, wherein YYYY, MM, and DD are numerical expressions of year, month, and day, respectively.

22. The method of claim 16, wherein each version identifier includes information for the time at which the respective version was created.

23. The method of claim 16, wherein the first lower level fragment includes at least one of title, synopsis, review, and cast for a first television program in the plurality of television programs.

24. A method implemented by an apparatus for managing metadata related to broadcasting multimedia content, the method comprising:

receiving an electronic document related to broadcasting a plurality of television programs, the electronic document having a hierarchical structure comprising an upper structural element and a plurality of lower structural elements located below the upper structural element in the hierarchical structure to describe broadcast information and content information for each of the television programs, a first lower structural element in the plurality of lower structural elements having a first version of metadata wherein the first lower structural element is identified by a first element identifier and the first version of metadata is identified by a first version identifier corresponding to a first calendar date for the first version;

requesting an update to the electronic document after the first calendar date; and in response to the request, receiving an update document, the update document including a first update portion identifying invalid elements and a second update portion that includes the upper structural element and updates to a subset of the lower structural elements, wherein the first update portion includes the first element identifier and a second version identifier to indicate that metadata in the first lower structural element is no longer valid, wherein the second version identifier corresponds to the first calendar date or a calendar date which corresponds to a reassignment of the first element identifier.

25. The method of claim 24, wherein the electronic document is in XML format.

26. The method of claim 24, wherein each of the first and second version identifiers is a numerical representation of the corresponding calendar date.

27. The method of claim 24, wherein each of the first and second version identifiers is expressed in the form of YYYYMMDD, wherein YYYY, MM, and DD are numerical expressions of year, month, and day, respectively.

28. The method of claim 24, wherein each of the first and second version identifiers includes information about the time at which the respective version was created.

29. The method of claim 24, wherein the first lower structural element has the first version of metadata that includes at least one of title, synopsis, review, and cast for a first television program in the plurality of television programs.

30. A method implemented by an apparatus for managing metadata related to broadcasting multimedia content, the method comprising:

storing an electronic document related to broadcasting a plurality of television programs, the electronic document having a hierarchical structure comprising an upper structural element and a plurality of lower structural elements located below the upper structural element in the hierarchical structure to describe broadcast information and content information for each of the television programs, a first lower structural element in the plurality of lower structural elements having a first version of metadata, wherein the first lower structural element is identified by a first element identifier and the first version of metadata is identified by a first version identifier corresponding to a first calendar date for the first version;

reassigning the first element identifier to another element in the electronic document at a second calendar date;

receiving a request from a client for an update of the electronic document after the second calendar date;

verifying that the client needs to be notified about the first element identifier being reassigned; and providing an update document to the client, the update document discriminating the first version of the first lower structural element as being invalid from a new version in which the first element identifier is assigned to the another element in the electronic document.

* * * * *